Apr. 10, 1923. 1,451,564

W. W. EDMISTER

BOTTLE ATTACHMENT

Filed Feb. 20, 1922

William W. Edmister
INVENTOR

BY Victor J. Evans
ATTORNEY

WITNESS:

Patented Apr. 10, 1923.

1,451,564

UNITED STATES PATENT OFFICE.

WILLIAM W. EDMISTER, OF KOKOMO, INDIANA.

BOTTLE ATTACHMENT.

Application filed February 20, 1922. Serial No. 538,136.

*To all whom it may concern:*

Be it known that I, WILLIAM W. EDMISTER, a citizen of the United States, residing at Kokomo, in the county of Howard and State of Indiana, have invented new and useful Improvements in Bottle Attachments, of which the following is a specification.

This invention relates to a handle for milk bottles and the like, the general object of the invention being to provide a device which can be easily and quickly applied to or detached from a bottle and which includes a handle whereby the bottle can be easily carried.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
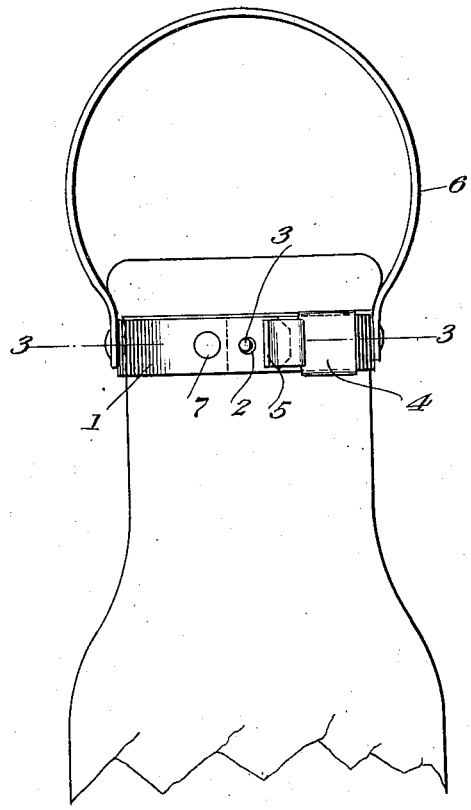
Figure 2:
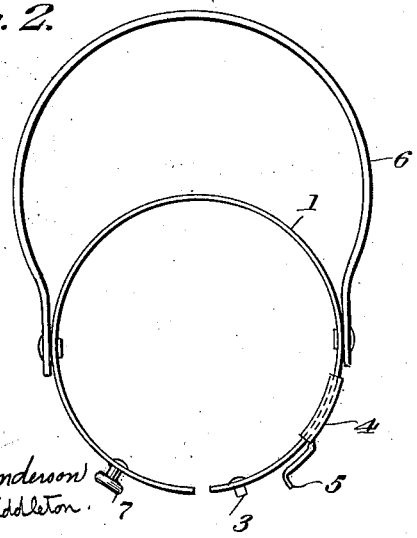
Figure 3:
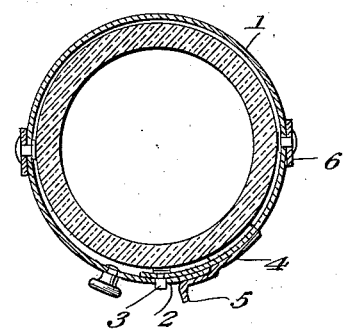

Figure 1 is a view showing the device in use upon a milk bottle.

The remaining figures are detail views.

As shown in these views the device comprises a band 1 of ring shape having one end provided with a hole 2 and the other end a stud 3 for engaging the hole so as to hold the two ends together. A slidable clip 4 is placed on the band so that one end thereof will pass over the perforated end of the band to hold the parts in locked position. This clip is provided with a finger piece 5 which lies in the same horizontal plane as the clip so that it can be easily slid into locking or unlocking position. A bail 6 is pivoted to the band so that it can be folded to permit the device to be carried in the pocket or hung up. When in use the bail extends at right angles from the ring, as shown. From the above it will be seen that the device can be easily and quickly placed around the neck of a milk bottle or other bottle and locked in this position by the sliding clip. The bottle can then be easily carried in the hand without danger of dropping it.

A handle 7 is connected with the ring for facilitating the fastening and unfastening of the same.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A bottle carrier of the character described comprising a band being provided with a hole adjacent one end, a stud projecting from the outer surface of the opposite end and being designed to engage the hole to connect the two ends together and forming a ring shaped member thereby, a clip slidably secured around the band and being adapted to pass over the stud and hole when said stud is operatively associated therewith to hold the stud locked therein, a finger piece secured to the clip and lying in the same horizontal plane therewith to facilitate its operation, a bail pivoted to the ring and a handle rigidly secured to the ring for the purpose specified.

In testimony whereof I affix my signature.

WILLIAM W. EDMISTER.